United States Patent [19]
Nomura

[11] Patent Number: 5,128,989
[45] Date of Patent: Jul. 7, 1992

[54] KEY TELEPHONE SYSTEM WITH CIRCUITRY FOR ADDING A THIRD CALLER TO A MULTIPLE PARTY CONNECTION

[75] Inventor: Yoshio Nomura, Sagamihara, Japan

[73] Assignee: Matsushita Electric Industrial Co., Ltd., Osaka, Japan

[21] Appl. No.: 614,127

[22] Filed: Nov. 16, 1990

[30] Foreign Application Priority Data

Nov. 27, 1989 [JP] Japan ................................. 1-307022

[51] Int. Cl.⁵ .......................... H04M 3/20; H04M 3/56
[52] U.S. Cl. ...................................... 379/158; 370/62
[58] Field of Search ............... 379/156, 157, 158, 159, 379/164, 165, 166; 370/62, 56

[56] References Cited

U.S. PATENT DOCUMENTS 4,802,206  1/1989  Yoshida et al. ...................... 379/158

FOREIGN PATENT DOCUMENTS 0033933  8/1981  European Pat. Off. .
2032731  5/1980  United Kingdom .
2091067  7/1982  United Kingdom .
2097634 11/1982  United Kingdom .
2100094 12/1982  United Kingdom .
2128448  4/1984  United Kingdom .
2157129 10/1985  United Kingdom .

Primary Examiner—Stafford D. Schreyer
Attorney, Agent, or Firm—Stevens, Davis, Miller & Mosher

[57] ABSTRACT

A key telephone system having an off-hook announcing function comprises a main unit and a plurality of standard key telephone sets each connected to the main unit. In the system, the main unit includes a plurality of digital telephone interface circuits connected to the key telephone sets and also a voice addition circuit. When one telephone set issues an off-hook announcement to another telephone set, the voice addition circuit adds together the voice signals received from the telephone sets and transmits the resultant added voice signal to yet another telephone set to provide to that telephone set an off-hook announcement.

3 Claims, 5 Drawing Sheets

KEY TELEPHONE SYSTEM WITH CIRCUITRY FOR ADDING A THIRD CALLER TO A MULTIPLE PARTY CONNECTION

BACKGROUND OF THE INVENTION

The present invention relates to a key telephone system which has a function of announcing an off-hook state.

In general, an off-hook announcing function in a telephone system is well known as one means for a third party C to inform to any of users A and B in mutual voice communication, i.e., to enable an off-hook announcement.

A prior art key telephone system of a type for realizing this sort of off-hook announcing function is schematically shown in FIGS. 1 to 3.

More in detail, FIG. 1 is a block diagram of the prior art key telephone system which comprises a main unit and a plurality of key telephone sets connected to the main unit to realize the off-hook announcing function, FIG. 2 is a diagram for explaining flows of voice signals (operational principle) of the system, and FIG. 3 is a block diagram showing a schematic arrangement of a key telephone having the off-hook announcing function (exclusive off-hook announcement telephone set or telephone set having an off-hook announcement adapter connected thereto).

The main unit 1 in FIG. 1 includes a time-divisional time switch (TSM) 2 for performing a switching operation over a PCM signal on a time divisional basis, digital telephone set interface circuits (DECs) 3 for forming an interface with a digital telephone set, and a PCM highway 4 through which the time divisional time switch 2 is connected to the digital telephone set interface circuit 3. Connected to the main unit 1 is a key telephone set (TEL.A) 5 having the off-hook announcing function through a so-called standard line 6 for realizing the fundamental functions and through an additional line 7 for the off-hook announcing function. Also connected to the main unit 1 are standard key telephone sets (TEL.B and TEL.C) 8 through the standard lines 6.

In FIG. 2, reference numeral 9 denotes a receive PCM highway from which a receive PCM signal is input to the time divisional time switch 2, 10 send PCM highway through which a send PCM signal is output, 11 a time slot arrangement of the receive PCM signal, 12 a time slot arrangement of the send PCM signal. Reference symbols A to C in the receive PCM signal represent received voice signals from telephone sets TEL.A to TEL.C and A to C in the send PCM signal represent sent voice signals to telephone sets TEL.A to TEL.C, respectively.

Shown in FIG. 3 is a detailed arrangement of a key telephone set 13 having the off-hook announcing function. More specifically, the off-hook announcement key telephone set 13 includes a pair of circuit block 17 and a control circuit (microprocessor) 15. Each of the circuit blocks 17 has a digital transmission interface circuit 17 formed as a digital transmission interface with the main unit 1 and a codec 15 connected to the associated digital transmission interface circuit 14. Each of the codecs 15 performs an analog/digital conversion over a voice signal. One of the circuit blocks 17 is connected through the standard line 6 to the main unit 1, while the other corresponding to the off-hook announcing function is through the additional line 7 to the main unit 1 as already explained above. Also included in the key telephone set 13 is an analog signal addition circuit 18 which adds together a usual speech signal received from one codec 15 and an off-hook announcement voice signal received from the other codec 15 of the circuit block 17 corresponding to the off-hook announcing function to form an addition signal and which selectively sends the addition signal through a speech-channel select switch 21 to one of receiver amplifiers 19 for a handset 22 or to one of amplifiers 20 for a monitor loudspeaker 23. Further, reference numeral 24 denotes a talk-back microphone, 25 a display, 26 a ten key panel.

Explanation will next be made as to the operation of the above prior art arrangement.

With the key telephone system of such an interconnection arrangement having the main unit and key telephone sets as shown in FIG. 1, when the off-hook announcement key telephone set 13 shown in FIG. 3 is connected in the arrangement to realize the off-hook announcing function, the system is operated as follows.

That is, assume now that the key telephone set A (TEL.A) having the off-hook announcing function and the standard key telephone set B (TEL.B) are in their mutual talk mode. Under such a condition, an off-hook announcement from another standard key telephone set C (TEL.C) can be carried out by sending an off-hook announcement voice signal from the telephone set C through the additional line 7 to the key telephone set A (TEL.A) having off-hook announcing function. The then flow of the voice signal is as shown in FIG. 2.

More in detail, the telephone set A (TEL.A), which has a time slot ($TS_n$) for usual speech and a time slot ($TS_{n+1}$) for the off-hook announcement, links the off-hook announcement voice signal received from the telephone set C (TEL.C) to the off-hook announcement time slot ($TS_{n+1}$) under the like control of the time divisional time switch 2, whereby the key telephone set A (TEL.A) of the off-hook announcing function can listen to the off-hook announcement voice signal from the telephone set C (TEL.C) through the additional line 7 of the off-hook announcing function and the circuit block 17 of the off-hook announcing function.

In this way, even in the prior art key telephone system, when a telephone set dedicated to off-hook announcement attached with a circuit for the off-hook announcing function is added, or when a telephone set connected with an adapter for the off-hook announcement and a line for the off-hook announcing function are added, there can be realized a key telephone system having the intended off-hook announcing function.

However, the aforementioned prior art key telephone system realizing the off-hook announcing function has many problems which include:

a) Impossible realization of the off-hook announcing function with respect to standard key telephone sets or independent telephone sets (all the telephone sets in the system) without their modification.

b) Necessity of an exclusive telephone set for the off-hook announcing function or a standard key telephone set having an additional circuit for the off-hook announcing function.

c) Necessity of additional special wiring works for the off-hook announcement.

d) Increase in the cost of the system caused by the necessity of the exclusive telephone set, special additional circuit and special wiring works.

SUMMARY OF THE INVENTION

It is an object of the present invention to provide a key telephone system which can solve the above problems in the prior art and which can have an off-hook announcing function while eliminating the need for any special additional circuit and wiring works for all telephone sets such as standard key telephone sets and independent telephone sets in the system.

In accordance with an aspect of the present invention, the above object is attained by providing in a main unit a voice signal addition circuit for adding together a voice signal received from a telephone set B (TEL.B) and an off-hook announcement voice signal received from a telephone set C (TEL.C) to transmit the addition resulting voice signal addition signal to a telephone set A (TEL.A), whereby an off-hook announcing function is realized by the third-party telephone set C with respect to a telephone set A (TEL.A).being now talking with the telephone set B.

Thus, since the voice signal addition circuit is provided in the main unit, the present invention can transmit the off-hook announcement voice signal from the third-party telephone set C which is not associated with the mutual speech between the telephone sets B and A while fully eliminating the need for such a key telephone set having the off-hook announcing function or such an additional line for the off-hook announcing function as in the prior art, and can be provided with the off-hook announcing function while fully eliminating the need for any special additional circuit and wiring works to all telephone sets including standard key telephone sets connected to the main unit and independent telephone sets to realize the off-hook announcement, that is, to provide the voice signal addition circuit in the main unit.

DESCRIPTION OF THE PREFERRED EMBODIMENT

Figure 1:
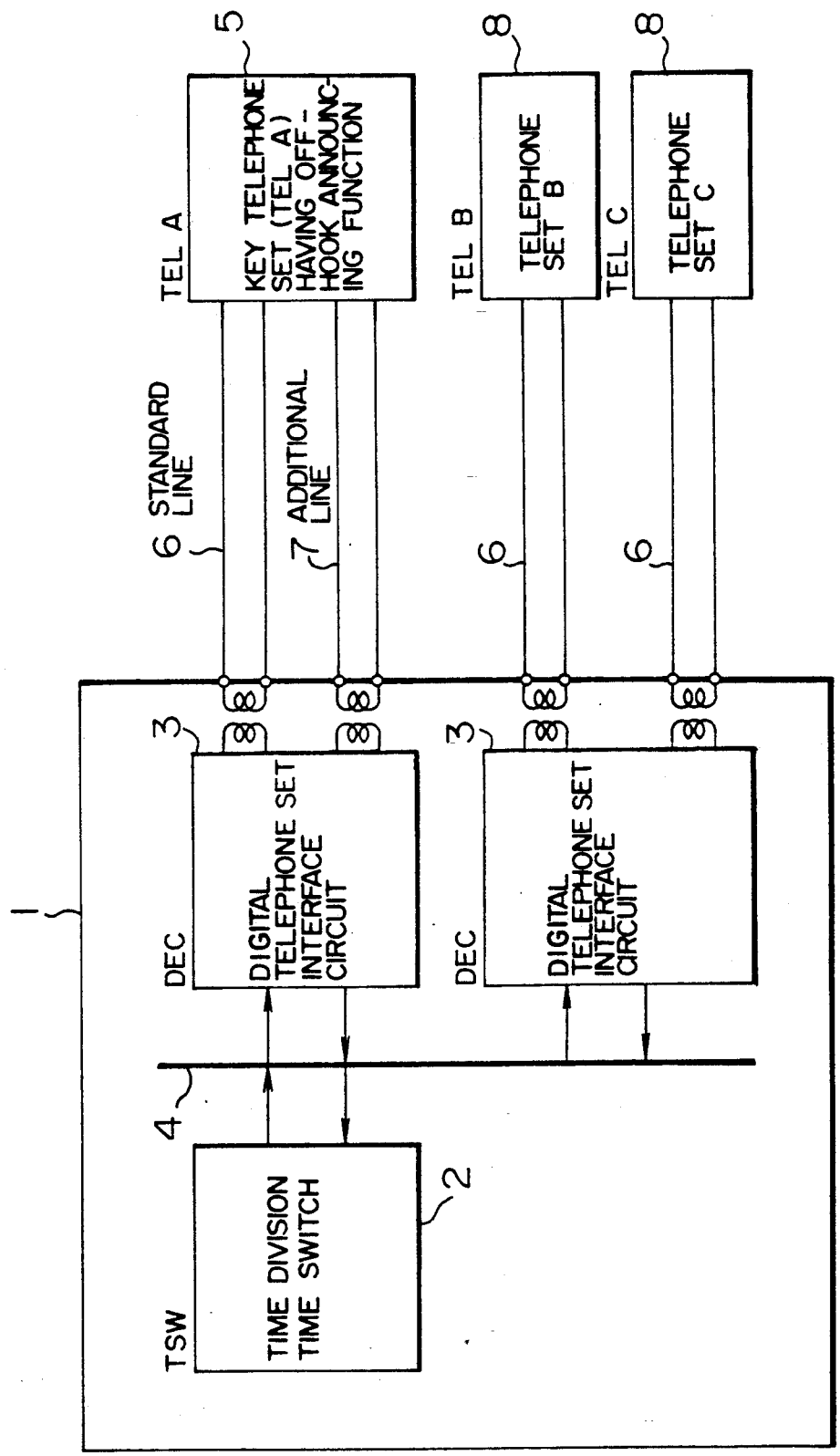
FIG. 1 is a block diagram showing a wiring arrangement of a prior art key telephone system comprising a main unit and key telephone sets to realize an off-hook announcing function.
Figure 2:
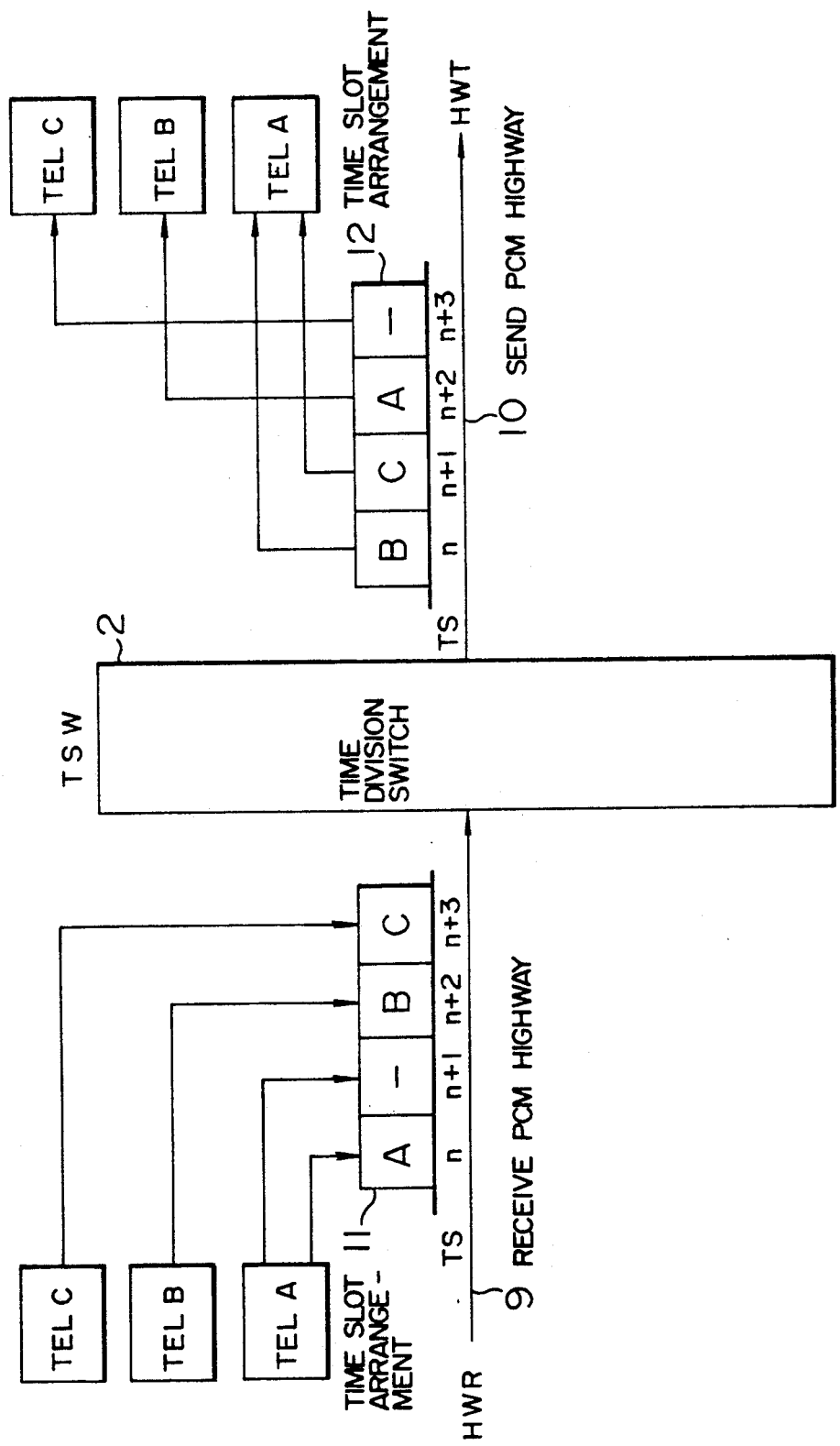
FIG. 2, is a diagram for explaining flows of voice signals (operational principle) of the system of FIG. 1.
Figure 3:
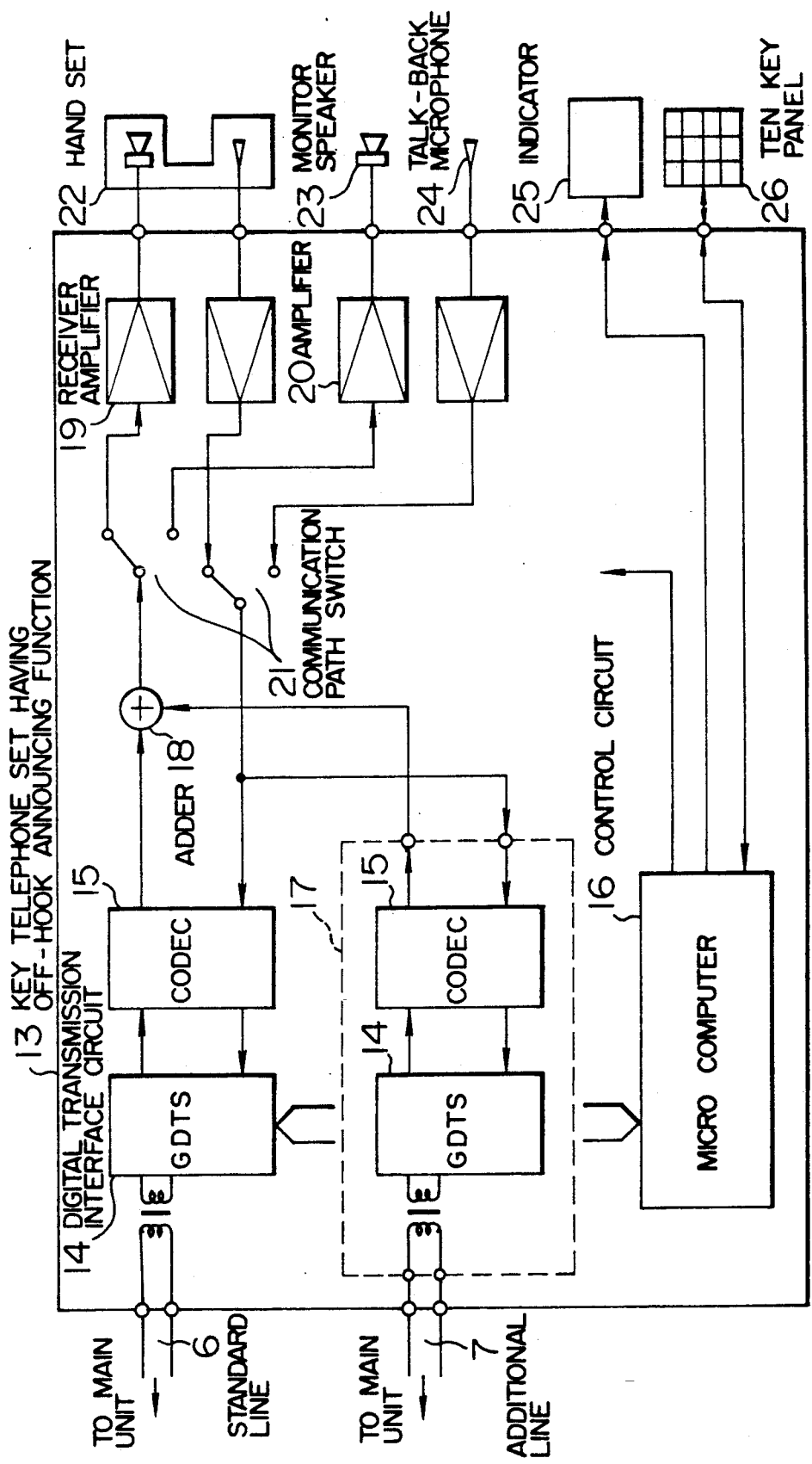
FIG. 3 is a block diagram showing a schematic arrangement of a key telephone set having the off-hook announcing function (telephone set exclusively for the off-hook announcement, or having an adapter for the off-hook announcement connected thereto)
Figure 4:
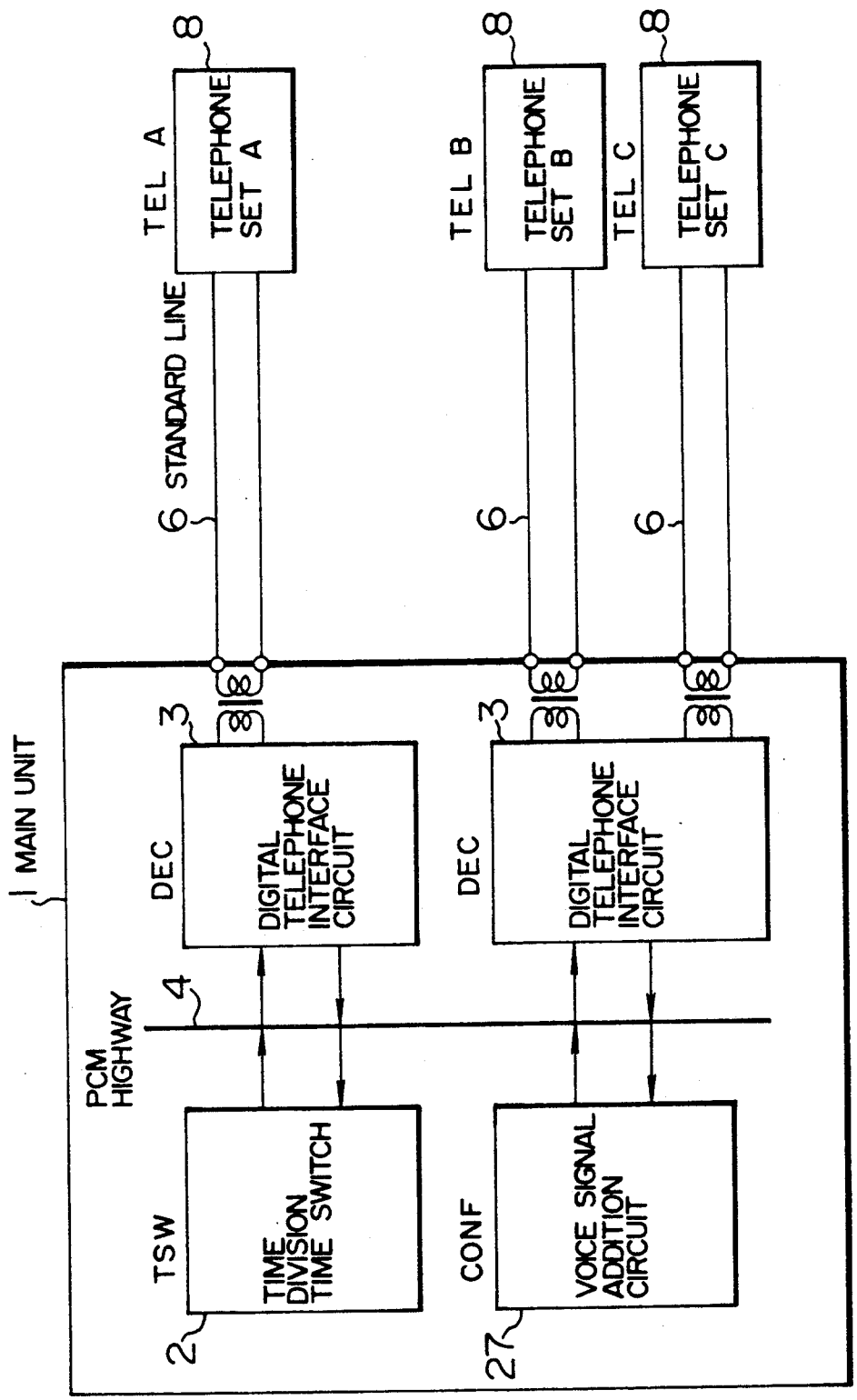
FIG. 4 is a block diagram showing a wiring arrangement of a key telephone system in accordance with an embodiment of the present invention which comprises a main unit and key telephone sets to realize the off-hook announcing function.
Figure 5:
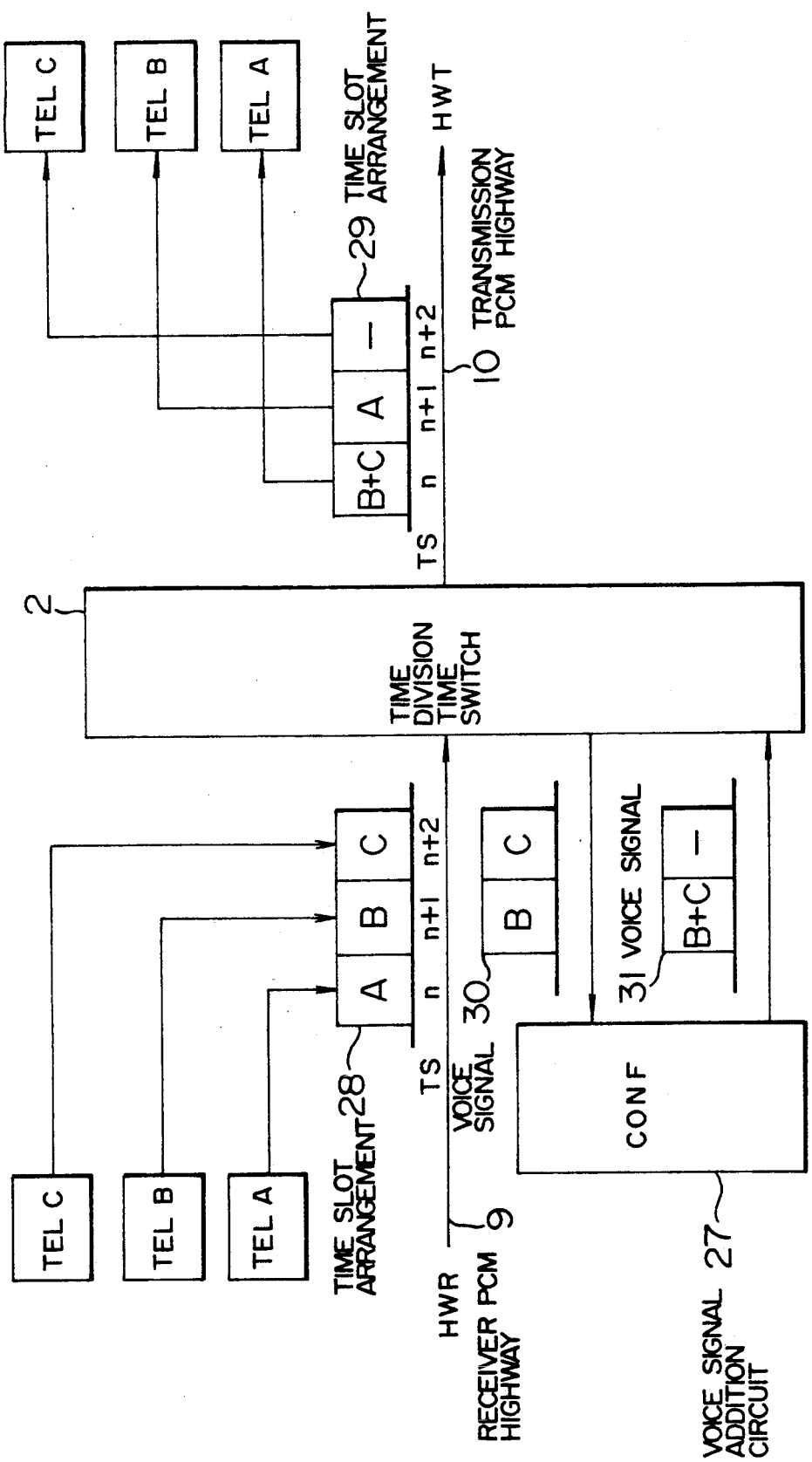
FIG. 5 is a diagram for explaining flows of voice signals (operational principle) of the system of FIG. 4.

Referring to FIGS. 4 and 5, there is shown an arrangement of a key telephone system in accordance with one embodiment of the present invention. More specifically, FIG. 4 is a block diagram showing a wiring arrangement of the system which comprises a main unit 1 and key telephone sets 8 to realize an off-hook announcing function, and FIG. 5 is a diagram for explaining flows of voice signals (operational principle) in the system.

In FIG. 4, the main unit 1 includes a time divisional time switch (TSW) 2 for performing switching operation over a PCM signal on a time divisional basis, digital telephone set interface circuits (DECs) 3 formed respectively as interfaces with the associated digital telephone sets (TEL.A, TEL.B and TEL.C) 8 (these elements 2 and 3 being the same as those in the main unit of the aforementioned prior art system), a voice signal addition circuit (CONF) 27 newly added in the present embodiment to provide the off-hook announcing function, and a PCM highway 4 connected between the time divisional time switch 2, digital telephone set interface circuit 3 and voice signal addition circuits 27. The telephone sets 8 are all of a standard type. In the present embodiment, it is required only to connect these telephone sets 8 to the associated digital telephone set interface circuits 3 of the main unit 1 through respective standard lines 6 as in the prior art, and the need for the special provision of such a key telephone set 5 having the off-hook announcing function and the additional wiring line 7 for the off-hook announcing function as in the prior art can be eliminated.

In FIG. 5, reference numeral 9 denotes a receive PCM highway from which a receive PCM signal is input to the time divisional time switch 2, 10 a send PCM highway to which a send PCM signal is output. The receive and send PCM signals on the receive and send PCM highways 9 and 10 have time slot arrangements 28 and 29 respectively. Reference symbols A to C on the receive PCM highway 9 represent voice signals received from the telephone sets A to C in the same manner as in the prior art, symbol A a voice signal to be transmitted to the telephone set B on the send PCM highway 10, and symbol B+C a voice signal corresponding to an addition of the voice signals received from the telephone sets B and C to be transmitted to the telephone set A. In addition, numeral 30 denotes a voice signal corresponding to the telephone sets B and C to be sent to the voice addition circuit 27, and 31 denotes a voice signal including the voice signal B+C corresponding to the addition of the voice signals of the telephone sets B and C to be returned from a voice addition circuit 27 to the time divisional time switch 2.

Explanation will next be made as to the operation of the foregoing embodiment. In the present embodiment, all the telephone sets (TEL.A to TEL.C) A to C in the system are standard key telephone sets and independent telephone sets as shown in FIG. 4.

When the telephone set C sends an off-hook announcing call to the telephone set A during mutual communication between the telephone sets A and B, a voice signal received from the telephone set B and the voice signal received from the telephone set C as the off-hook announcing call are applied to the voice addition circuit 27 under the link control of the time divisional time switch 2 as shown in FIG. 5. The voice addition circuit 27, when receiving the voice signals from the telephone sets B and C, adds these voice signals together to form a voice signal B+C and sends the voice signal B+C back to the time divisional time switch 2. The time switch 2, when receiving the voice signal B+C from the addition circuit 27, transmits the voice signal B+C containing the off-hook announcing call to the telephone set A which in turn can listen to the off-hook announcement of the telephone set C contained in the received voice signal.

With the arrangement of the present embodiment, through the aforementioned operation, an off-hook announcing voice signal can be transmitted to the telephone set A communicating with the telephone set B from the telephone set C which is not associated with the communication between the telephone sets A and B. Further, since the voice addition circuit 27 is provided in the main unit to realize the off-hook announcement, all the telephone sets connected to the main unit can be provided with the intended off-hook announcing function.

What is claimed is:

1. A key telephone system having an off-hook announcing function, said telephone system comprising a main unit, at least three telephone sets, each of said telephone sets being connected to said main unit by a pair of telephone lines, and a voice addition circuit operatively connected to each of said telephone sets, said voice addition circuit adding a voice signal from one of a plurality of said telephone sets which are currently in communication with each other and a voice signal from another one of said at least three telephone sets which is attempting to communicate with one of said plurality of telephone sets already in communication to send an off-hook announcing signal to another one of said plurality of telephone sets in communication with each other.

2. A key telephone system having an off-hook announcing function, said key telephone system comprising a main unit and at least three telephone sets each connected to said main unit by two telephone lines, said main unit comprising a voice addition circuit to provide an addition signal obtained by adding a voice signal received from a first telephone set of at least a pair of telephone sets of said at least three telephone sets when said at least a pair of telephone sets are communicating with each other and a voice signal received from a third one of the at least three telephone sets which is attempting to communicate with a second telephone set of said at least a pair of telephone sets, which is already in communication with said first telephone set, and to transmit said addition signal to said second telephone set.

3. A key telephone system having an off-hook announcing function comprising a main unit and at least three standard key telephone sets each connected to said main unit by two telephone lines, the main unit comprising a plurality of digital telephone set interface circuits connected to respective ones of said at least three key telephone sets, said main unit further comprising a voice addition circuit to provide an addition voice signal obtained by adding together a voice signal received from a first telephone set of at least a pair of telephone sets of said at least three telephone sets, when said pair of telephone sets are communicating with each other, and a voice signal from a third one of said at least three telephone sets which is attempting to communicate with a second telephone set of said pair of telephone sets, which is already in communication with said first telephone set, and to transmit said addition voice signal to said second telephone set to provide said off-hook announcing function.

* * * * *